United States Patent [19]

Brolin et al.

[11] 3,745,262

[45] July 10, 1973

[54] AMPLIFIER ARRANGEMENT FOR TELEPHONE INSTRUMENT

[75] Inventors: Ulf Erik Brolin, Handen; Owe Gunnar Lindgren, Farsta, both of Sweden

[73] Assignee: Telefonaktiebolaget LM Ericsson, Stockholm, Sweden

[22] Filed: Dec. 1, 1971

[21] Appl. No.: 203,599

[30] Foreign Application Priority Data

Dec. 22, 1970 Sweden .......... 17418/70

[52] U.S. Cl. .......... 179/81 B
[51] Int. Cl. .......... H04m 1/00
[58] Field of Search .......... 179/81 B, 1 A, 1 HF, 179/1 UL

[56] References Cited

UNITED STATES PATENTS

| | | | |
|---|---|---|---|
| 3,395,255 | 7/1968 | Clement | 179/81 B |
| 3,171,901 | 3/1965 | Clemency | 179/81 B |
| 3,461,240 | 8/1969 | Lindgren | 179/81 B |
| 3,562,791 | 2/1971 | Baker | 179/81 B |

*Primary Examiner*—Ralph D. Blakeslee
*Attorney*—Hane, Baxley & Spiecens

[57] ABSTRACT

An amplifier arrangement for controlling the output level of an amplifier used in a two-wire line telephone system comprises an attenuation circuit, a memory circuit, an integration circuit and a test device. The output level of the amplifier is tested by the test device and if the output level is too high activates the integration circuit. When the output voltage of the integration circuit exceeds a certain value the memory circuit changes state to (1) activate the attenuation circuit so that the output level of the amplifier is decreased, and (2) re-set the integration circuit. The memory circuit remains in its changed state until the direct voltage level of the two-wire line is essentially changed in which case the memory circuit is re-set to the original state and the attenuation circuit is no longer activated and the integration circuit may again be started by the test device.

7 Claims, 4 Drawing Figures

Patented July 10, 1973 3,745,262

2 Sheets-Sheet 2

AMPLIFIER ARRANGEMENT FOR TELEPHONE INSTRUMENT

The present invention relates to an amplifier arrangement for telephone instrument which includes a microphone connected to a two-wire line, an amplifier for amplification of speech currents incoming from the two-wire line and intended for a receiving unit, and an attenuation circuit for influencing the amplification of the incoming speech currents.

The invention can be utilized for a lowspeaking telephone instrument as well as a loudspeaking telephone instrument but is perhaps specially suitable as an addition to already existing automatic and/or manual amplification control equipments.

A loudspeaking telephone instrument has a limited dynamic range. The lower limit of the range is determined by the room noise, etc. and the upper limit is determined either by the maximum desired loudness of the loudspeaker or that the output amplifier of the telephone instrument cuts out due to limited current. Such apparatus are known where the subscriber has a volume control button which can change the reception volume by about 8dB in order to compensate for the variations in the line level caused for different line lengths, low voice level at or by improper handling of the hand microtelephone of the other subscriber, etc. Practice has, however, shown that 8dB is not sufficient, and, consequently, at least the double control range, i.e., 16dB, should be desirable. A jump of 16dB can, however, be many times be too large, for a single volume button control. Therefore two different volume buttons have been proposed. Such a solution has, however, been considered unsuitable because more complicated handling is required and the instance of the possibility of selecting the wrong volume.

An object of with the present invention is to eliminate with a kind of automatic volume control the abovementioned drawbacks, among other things. The characteristics for an amplifier arrangement constructed according to the invention appear from the appended claims.

Figure 1:
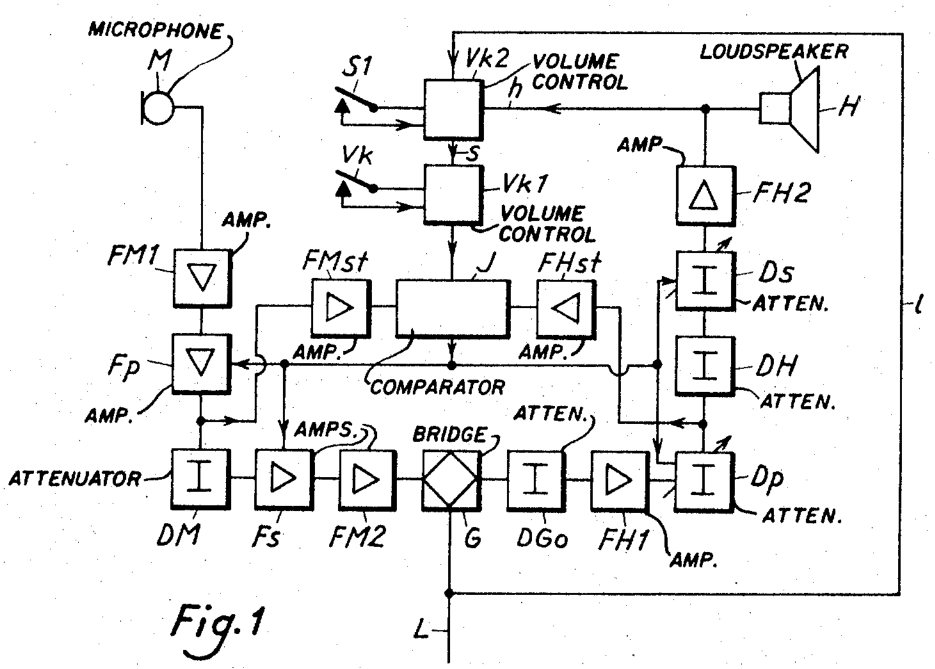
Figure 2:
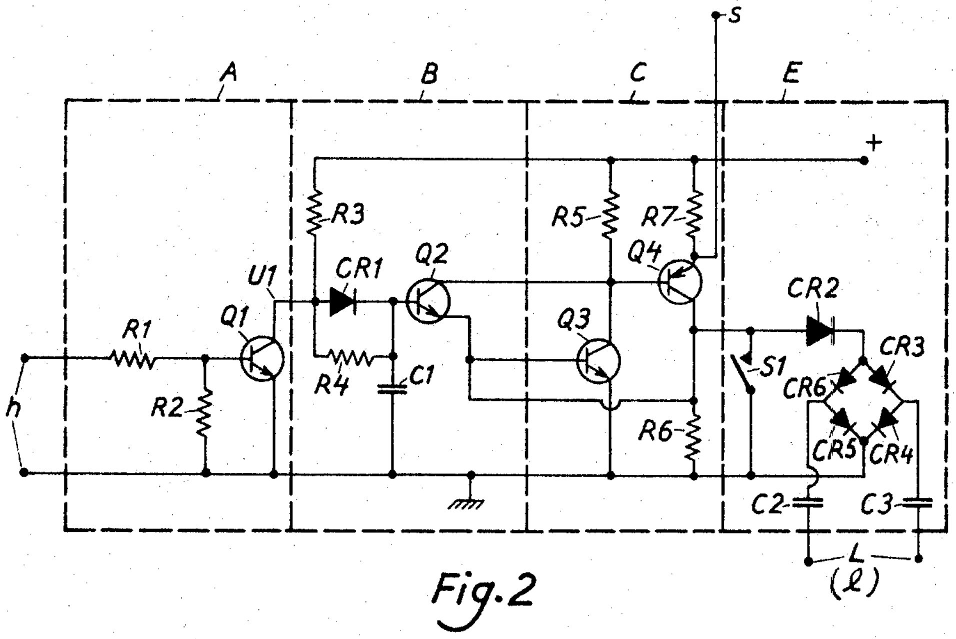
Figure 3:
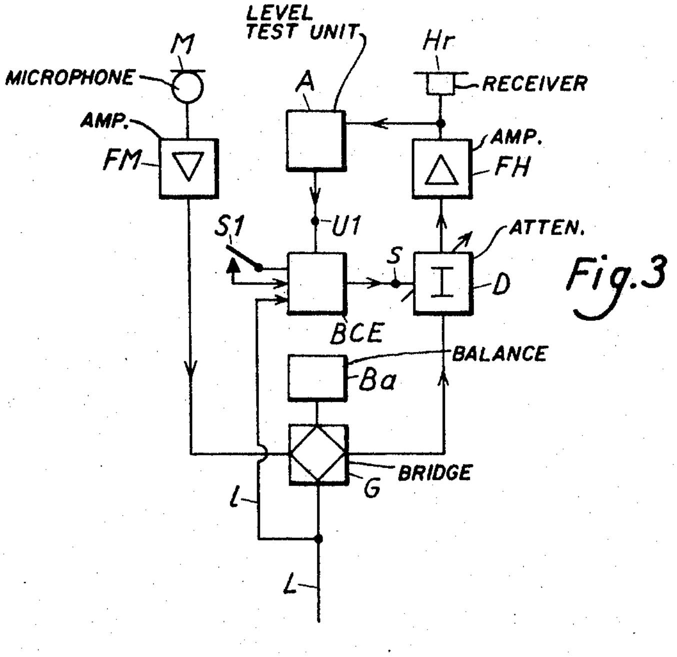
Figure 4:
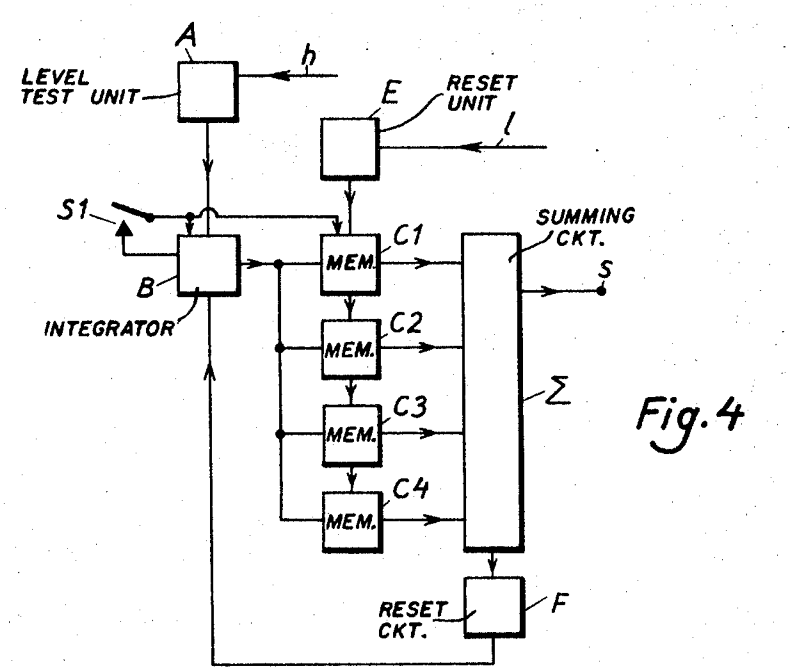

The invention will be described more in detail in connection to the accompanying drawings, where FIG. 1 shows schematically a block diagram of a loudspeaking telephone instrument, FIG. 2 shows a circuit diagram for a control branch included in the apparatus according to FIG. 1, FIG. 3 shows a block diagram of a lowspeaking telephone instrument, FIG. 4 shows a modified block diagram.

The arrangement according to FIG. 1 includes amplifiers FM1, F*p*, F*s* and FM2 for amplifying outgoing speech currents connected coming from a microphone M to a two-wire line L, and amplifiers FH1 and FH2 for amplifying speech currents incoming from the two-wire line L and intended for a loudspeaker H. The microphone branch comprises furthermore an attenuation circuit DM, and the loudspeaker branch includes furthermore attenuation circuits DG*o*, D*p*, DH and D*s*. Of the said units the units FM1, FM2, FH1 and FH2 are fixed amplifiers and the units DM, DG*o* and DH are fixed attenuation circuits, i.e. their amplification and attenuation respectively are once and for ever adjusted, while the units F*p* and F*s* are controllable amplifiers and the units D*p* and D*s* controllable attenuation circuits, i.e. their amplification and attenuation respectively can be varied by means of control signals. The control of the units F*p*, F*s*, D*p* and D*s* occurs from a comparison circuit J of the integration type which in its turn obtains control voltages from a control voltage terminal between the amplifier F*p* and the attenuation circuit DM in the microphone branch and from a control voltage terminal between the attenuation circuits D*p* and DH in the loudspeaker branch. Between these control voltage terminals and the comparison circuit J there are fixed amplifiers FMst and FHst respectively. In the comparison circuit J there occurs, in known manner, an evalution of the levels in the microphone- and loudspeaker branches and the generation of suitable control signal for units F*p*, F*s*, D*p* and D*s*, so that with respect to desired sound levels and the risk of feed back howl, suitable adjustments of the different units are achieved.

The control signal from the comparison circuit J can be adjusted also in dependence on a volume control V*k*1 responding to a manually operable button V*k* which corresponds to a volume change of 8dB desired by a subscriber as mentioned previously.

In FIG. 1 a further volume control V*k*2 is indicated which opposed as to the control V*k*1 is an automatic volume control and which likewise can influence the control signal from the comparison circuit J. The control V*k*2 has an input connected to the line L as well as to the output of the amplifier FH2.

The automatic volume control V*k*2 comprises a control branch of units A, B, C, see FIG. 2, for the automatic control of the first amplifier F*p* and the first attenuation circuit D*s* via the comparison circuit J, but can also simultaneously control the amplifier F*s* and the attenuation circuit D*p*. This case is indicated in FIG. 1.

The control branch A, B, C comprises, connected in series, a level testing unit A whose input h is connected to the output of the amplifier FH2, an integration circuit B and a memory circuit C. The integration circuit B is arranged to integrate at time moments during which the output level of the amplifier FH2 exceeds a certain, beforehand-fixed, level, and to switch, after a certain integration time, the memory circuit C from a first condition 0, corresponding to a relatively low amplification degree for the amplifiers F*p* and F*s* and relatively low attenuation degree for the attenuation circuits D*p* and Ds for signals to the loudspeaker from the line, and to a second condition 1, corresponding to a relatively high amplification degree at the amplifiers F*p* and F*s* and relatively high attenuation degree for the attenuation circuits Dp and Ds. The output s of the memory circuit C is, via the control circuit V*k*1, connected to a control input of the comparison circuit J. As mentioned above, the switching of the memory circuit from 0 to 1 occurs via the testing unit A and the integration circuit B, but the re-setting to 0 occurs directly via a connection 1 from the line L provided that the level on this line is changed, essentially because of, e.g., impulsing, polarity reversal or similar connection operations. A third possibility is that the subscriber himself causes the re-setting by pressing a button S1, namely if, for example, a person with a relatively loud voice gives the apparatus to a person with a relatively low voice.

The details of the automatic volume control can of course be realized in many ways without departing from the spirit of the invention. As an example the embodiment shown in FIG. 2 will now be explained in greater detail.

The level testing unit A comprises a transistor Q1 with a resistance R1 between the base of the transistor and one of the input terminals h and with a resistance R2 between the base and the emitter of the transistor. The components included are so chosen that when the output level of the amplifier FH2 (FIG. 1) is less than a certain beforehand-determined value, the transistor Q1 is conducting and prevents therewith the integration circuit B from actuating the memory circuit C. If, on the contrary, the output level of the amplifier FH2 exceeds such determined value, the transistor Q1 is blocked and its output U1 is at higher potential.

The integration circuit B comprises a transistor Q2 with a capacitor C1 between the base of the transistor and a ground wire and with a parallel circuit consisting of a rectifier CR1 and a resistance R4 between the base of the transistor and the output U1 of the unit A which, furthermore, via a resistance R3, is connected to a positive potential +. When the output level of the amplifier FH2 is below the determined value and the transistor Q1 is conducting, the capacitor C1 is uncharged and the transistor Q2 is non-conducting. When the output level of the amplifier FH2 exceeds said determined value and the transistor Q1 is non-conducting (blocked) the capacitor C1 is charged via the resistance R3. If the level just immediately after that sinks essentially, so that the transistor Q1 once again becomes conducting, a discharge of the capacitor C1 occurs via a resistance R4. Since human speech has short energy peaks synchronized with the vocal cord frequency, more consideration must be taken for the time periods when the level of the amplifier FH2 lies above the determined value than to the time periods when the level lies below this value, i.e. one must to chose the components so that the time constant of resistor R3 and capacitor C1 is relatively short and the time constant of resistor R4 and capacitor C1 is relatively long. By suitable choice of the relation between the resistances R3 and R*e* the time can thus be determined which is required for the transistor Q2 to be conducting and therewith send a switching signal to the memory circuit C.

The memory element C comprises two transistors Q3 and Q4 of which the transistor Q3 has its base connected to the emitter of the transistor Q2, its emitter connected directly to the ground wire and its collector connected via a resistance R5 to the positive potential +, while the transistor Q4 has its base connected to the collector of the transistor Q3, its emitter connected via a resistance R7 to the positive potential + and its collector connected to the base of the transistor Q3 and, via a resistance R6, to the ground wire. The collector of the transistor Q4 is connected to the output *s* of the memory element. When the output level of the amplifier FH2 is less than said determined value, the transistors Q3 and Q4 are non-conducting, as the transistor Q2 is nonconducting. When said output level during a certain integration time has exceeded the determined value, the transistor Q2 becomes conducting and therewith also the transistors Q3 and Q4 and control signal passes from the output s and the control circuit V*k*1 in FIG. 1 to the comparison circuit J. The transistors Q3 and Q4 then remain conducting, even if the output level of the amplifier FH2 temporarily is below said determined value. If on the contrary the button S1 is pressed, so that the collector of the transistor Q4 is directly grounded, the transistors Q3 and Q4 become blocked (nonconducting) and the memory element is re-set to the condition 0. An automatic re-setting to the condition 0 occurs each time when on the line a fast and large voltage change appears on lines L. This voltage step is fed via capacitors C2, C3, a silicon diode bridge CR3–CR6 and a series connected silicon diode CR2 directly to the collector of the transistor Q4.

The above describes the invention in connection with a loudspeaking telephone instrument. The invention can, however, as is indicated, also be used with lowspeaking telephone instruments and then specially with such types which are equipped with electronic components, as microphone amplifiers, telephone receiver amplifiers, key set selectors and so on. The lowspeaking telephone instrument shown in FIG. 3 has in the microphone branch a microphone M and a microphone amplifier FM, and in the telephone receiver branch a telephone receiver H*r*, a telephone receiver amplifier FH and an attenuator D. The two branches are connected to the line L via a transmission bridge G which is terminated with a balance B*a*. The level testing unit A is connected to the output of the telephone receiver amplifier and to the units B, C, E in the same manner as described above. Via the connection 1 to the line L and the button S1 the memory circuit C can be adjusted from 1 to 0 as is previously described, automatically and manually respectively.

Another advantage with the arrangement according to the invention is that in a speech controlled loudspeaking telephone instrument the speech control deviation can constantly be adapted to what in each separate case is demanded with regard to line length and so on, so that the switching times thereby are reduced to a minimum and in many cases are completely negligible.

With a modification of the control branch ABCE in accordance with FIG. 4 it is possible to achieve a better adjustment of the attenuation to the prevailing transmission technical conditions for each special occasion. The level testing unit A is connected to the integration circuit B, the output of which is connected to the input of a number of memory elements C1, C2, C3, C4 included in the memory circuit C. The outputs of the memory elements are connected to a summing circuit Σ, from the output of which is fed a suitable control signal for actuating the attenuation degree of the attenuation circuits and the amplification degree of the amplifiers, compare with FIG. 1. Re-setting of the memory elements occurs via the circuit E or the button S1. Via the summary circuit Σ and a zero-setting or resetting circuit F the integration circuit B is reset to its original condition before the beginning of an integration each time a memory element is switched to the other condition 1. Such resetting occurs also at pressing the button S1. Said control branch is intended to function in the following manner. When the level testing organ A senses an amplifier level exceeding a beforehand determined level, the integration circuit B begins to integrate the signal from the unit A, and when the integral voltage from the circuit B exceeds a certain, for the memory element C1, fixed threshold value, this memory element is set to 1. Thus, there is fed a suitable control signal, via the summary circuit Σ and the output s and to the attenuation circuit D in FIG. 3 or the amplifiers F*p*, F*s* and the attenuation circuits D*p*, D*s* in FIG.

1, an activation signal to the next following memory element C2, and a resetting signal to the integration circuit B. If the output level of the output amplifier in spite of this be to high, the circuit B begins again to integrate the signal from the unit A, and when the integral voltage from the circuit B now exceeds a certain, for the memory element C2, fixed threshold value, this memory element is switched to 1 etc. With the combination shown in FIG. 4 five different adjustments be made, the adjustment number 1 corresponding to the configuration 0000 for the four elements and the adjustment number 5 corresponding to the configuration 1111. The system is in this connection so arranged that, for example, in order for the memory element C3 to be switched to 1, the two elements C1 and C2 must already have switched to 1, and if element C1 is reset to 0 then the resetting of elements C2 and C3 also occurs.

We claim:

1. Volume controlled telephone instrument comprising: terminal means adapted to be connected to a subscriber line; a speaker means; a receiver circuit connected between said terminal means and said speaker means comprising a speech current amplifier and a signal-controllable signal attenuator; a microphone; a transmitter circuit connected between said microphone and said terminal means comprising an amplifier means; and an automatic volume control means for controlling the operation of said signal-controllable signal attenuator comprising a signal level test means having an input connected to said speech current amplifier and an output, said signal level test operating in a binary manner dependent on a predetermined threshold level of the speech signal from said speech current amplifier, an integrating circuit means having an input connected to the output of said signal level test means and operative to generate an amplitude increasing signal as long as said signal level test means senses that the speech signal is above said predetermined threshold level, and a memory means comprising a bistable control signal generator means having a set input connected to said integrating circuit means, a clear input connected to said terminal means and a control signal output for generating an attenuating control signal having a first valve when set to a first state when the amplitude of the signal generated by said integrating circuit means exceeds a given level and for generating the attenuating control signal having a second value when cleared to a second state in response to a particular change in the direct voltage on the subscriber line, and connecting means for connecting said control signal output of said bistable control signal generator means to said signal-controllable signal attenuator.

2. The volume controlled telephone instrument of claim 1 further comprising manually operable means connected to said clear input of said bistable control signal generator means for independnetly clearing the latter to the second state.

3. The volume controlled telephone instrument of claim 1 wherein said connecting means comprises a signal comparator means having first and second inputs for receiving the signals whose amplitudes are to be compared and an output for transmitting a control signal having an amplitude related to the relative amplitudes of the signals received at said first and second inputs, said first input being connected to said receiver circuit, said second input being connected to the output of said bistable control signal generator and said output being connected to signal-controllable signal attenuator.

4. The volume controlled telephone instrument of claim 1 wherein the amplifier means connecting said microphone to said terminal means is a gain-controlled amplifier whose gain is controllable by a control signal received at a control signal input and further comprising connecting means for connecting the control signal input of said gain-controlled amplifier to the output of said bistable control signal generator.

5. The volume controlled telephone instrument of claim 4 wherein said connecting means comprises a signal comparator means having first and second inputs for receiving the signals whose amplitudes are to be compared and an output for transmitting a control signal having an amplitude related to the relative amplitudes of the signals received at said first and second inputs, said first input being connected to said transmitter circuit, said second input being connected to the output of said bistable control signal generator and said output being connected to signal-controllable signal attenuator.

6. The volume control instrument of claim 1 wherein said integrating circuit means includes two alternately operable timing circuits, one having a longer time constant than the other, said one being operable when the speech signal is above said predetermined threshold level and said other being operable when the speech signal is below said predetermined threshold level.

7. The volume control instrument of claim 1 wherein said integrating circuit means includes a clearing input and said memory means comprises a plurality of bistable control signal generator means each having a set input connected to said integrating circuit means, a clear input connected to said terminal means and a control signal output for generating an attentuating control signal having a first value when set to a first state when the amplitude of the signal generated by said integrating circuit means exceeds a given level and for generating the attenuating control signal with a second value when cleared to a second state in response to a particular change in the direct voltage on the subscriber line, all but one of said bistable control signal generator means having a further input for sensitizing its set input to receive signals from said integrating means only when a different other one of said bistable control signal generator means is in said first state, means for connecting the outputs of said bistable control signal generator means to the clearing input of said integrating circuit means for clearing the latter each time one of said bistable control signal generator means is switched to said first state, and signal summing means for connecting the outputs of said bistable control signal generator means to said signal-controllable signal attenuator.

* * * * *